(12) United States Patent
Webster et al.

(10) Patent No.: US 7,438,044 B2
(45) Date of Patent: Oct. 21, 2008

(54) LIGHT-WEIGHT COMPACT DIESEL ENGINE

(75) Inventors: Gary Webster, Ottawa (CA); Dennis Raymond, Gatineau (CA)

(73) Assignee: Advanced Engine Technology Ltd., Nepean, ON (CA)

( * ) Notice: Subject to any disclaimer, the term of this patent is extended or adjusted under 35 U.S.C. 154(b) by 0 days.

(21) Appl. No.: 11/459,442

(22) Filed: Jul. 24, 2006

(65) Prior Publication Data

US 2007/0163538 A1 Jul. 19, 2007

Related U.S. Application Data

(60) Provisional application No. 60/702,292, filed on Jul. 26, 2005.

(51) Int. Cl.
F02F 3/24 (2006.01)
F02F 3/28 (2006.01)

(52) U.S. Cl. ............................. 123/269; 123/257

(58) Field of Classification Search ............... 123/257, 123/261, 269, 275, 281–284, 295, 305
See application file for complete search history.

(56) References Cited

U.S. PATENT DOCUMENTS

| | | | | |
|---|---|---|---|---|
| 1,620,124 A * | 3/1927 | Nielsen | ............... | 123/257 |
| 2,111,282 A * | 3/1938 | Edwards | ............... | 123/65 BA |
| 2,119,633 A * | 6/1938 | Edwards | ............... | 184/18 |
| 3,270,722 A * | 9/1966 | Springer | ............... | 123/255 |
| 4,317,432 A * | 3/1982 | Noguchi et al. | ............... | 123/1 R |
| 4,576,126 A * | 3/1986 | Ancheta | ............... | 123/41.38 |
| 4,955,338 A | 9/1990 | Diwakar et al. | | |
| 5,031,594 A * | 7/1991 | Morikawa | ............... | 123/295 |
| 5,060,602 A * | 10/1991 | Maissant | ............... | 123/47 A |
| 5,144,919 A * | 9/1992 | Franz | ............... | 123/65 W |
| 5,277,159 A * | 1/1994 | Webster | ............... | 123/254 |
| 5,960,766 A * | 10/1999 | Hellmich | ............... | 123/295 |
| 5,996,548 A * | 12/1999 | Hellmich | ............... | 123/295 |
| 6,158,409 A * | 12/2000 | Gillespie et al. | ............... | 123/193.6 |
| 6,435,159 B1 * | 8/2002 | Craft et al. | ............... | 123/298 |
| 6,481,394 B1 * | 11/2002 | Hiki | ............... | 123/65 PE |

* cited by examiner

Primary Examiner—Mahmoud Gimie
(74) Attorney, Agent, or Firm—Marks & Clerk

(57) ABSTRACT

Disclosed is a diesel engine comprising a cylinder head; a combustion chamber within the cylinder head, the combustion chamber being in the shape of a bowl; and a piston having a piston crown, the piston crown having a dome-shape for protruding within the cylinder head during a combustion operation near or at top dead center. The engine is preferably a two stroke crankcase compression engine. Use of a combustion chamber in the shape of a shallow bowl along with other parameter selection decreases the rates of combustion pressure rise while providing reasonable power output.

14 Claims, 4 Drawing Sheets

LIGHT-WEIGHT COMPACT DIESEL ENGINE

CROSS-REFERENCE TO RELATED APPLICATION

This application claims the benefit of U.S. Provisional Application No. 60/702,292 filed Jul. 26, 2005, incorporated by reference herein.

FIELD OF THE INVENTION

The present invention relates to diesel engines. More specifically, the present invention relates to a small light-weight compact diesel engine.

BACKGROUND OF THE INVENTION

Diesel engines typically tend to be larger, heavier and more massive than comparable gasoline engines. This is because of the heavier construction required to withstand rates of combustion pressure rise immediately after ignition and the higher combustion pressures needed for compression ignition. In particular, usually a major portion of the combustion chamber is located in the piston. This generally causes the engine to be taller and also leads to the requirement for a heavier stronger piston.

Diesel engines are also known for some unburned hydrocarbon exhaust emissions that can result in increased deposits, especially on the piston and elsewhere in the combustion chamber. This creates difficulties with very small displacement engines where the clearance between the piston and cylinder head is small.

Diesel engines have, however, certain advantages that make them suitable for applications where durability is important. Unfortunately, the bulkiness of diesel engines has hitherto been a major disadvantage in mobile applications, especially when they have to be delivered to site by aircraft or human transport. The key to reducing the weight of the engine is to reduce the rates of combustion pressure rise in conjunction with lower compression ratios. Unfortunately, with these lower compression ratios it is hard to get diesel fuels to ignite by compression ignition.

SUMMARY OF THE INVENTION

Accordingly it is an object of embodiments of the invention to obviate or mitigate the problems of the prior art. A light-weight compact fully-operational diesel engine is disclosed. The described engine is particularly useful for small light-weight applications, such as air borne portable generator sets.

The diesel engine has a combustion chamber in the shape of a broadened shallow bowl in the cylinder head, thus reducing rates of combustion pressure rise. The geometry of the chamber and use of a glow plug (for starting purposes as described below) leads to operation with a lower compression ratio. Lower compression ratios enable fuel to be combusted in a manner that is less stressful on the crankcase rotating components and makes it easier to start by hand.

Thus, according to one aspect, the invention provides a diesel engine comprising a cylinder head; a combustion chamber within the cylinder head, the combustion chamber being in the shape of a shallow broadened bowl; and a piston having a piston crown, the piston crown having a dome-shape for protruding upwards within the cylinder head's shallow broadened bowl during compression/combustion prior to or at top dead center.

There are many advantages in using a diesel engine in accordance with this invention. Specifically, one advantage of the use of a combustion chamber in the shape of a shallow bowl with a piston crown that protrudes into the combustion chamber is that a variable geometry effect is achieved, which has the effect of reducing the rates of combustion pressure rise while providing reasonable power output.

An engine in accordance with the teachings of this invention weighs about 18 lbs and provides a power output of about 0.3 kW to 2 kW of electrical power at 90% mechanical to electrical conversion efficiency.

The engine is preferably a two-stroke engine with intake and exhaust ports in the cylinder liner, although the invention can be equally well applied to a four-stroke engine with intake/exhaust valves, with an associated increase in engine weight, size and complexity.

Accordingly, in one aspect, the invention provides A small diesel engine comprising a small cylinder having a cylinder head defining a combustion chamber therein, the combustion chamber being in the shape of a broadened shallow bowl; a piston reciprocally mounted within said cylinder, the piston having a piston crown in the shape of a dome for protruding within the bowl-shaped combustion chamber during a compression/combustion event before and after top dead center, piston protruding so as to enter the combustion chamber and provide a variable geometry combustion chamber when the piston is moving down after the top of its stroke; a fuel injector for injecting fuel spray plumes into said combustion chamber to facilitate the combustion process during the downward stroke of the piston; and a glow plug in the cylinder head and protruding into the bowl-shaped chamber in close proximity to the injected fuel spray plume but not in direct contact with the injected fuel to thereby facilitate fuel ignition at moderate compression ratios during engine starting, thereby facilitating use of a small cylinder displacement; wherein a minimal squish area is defined between the bowl-shaped chamber and edges of the piston as the piston approaches top dead center.

Other aspects and advantages of embodiments of the invention will be readily apparent to those ordinarily skilled in the art upon a review of the following description.

BRIEF DESCRIPTION OF THE DRAWINGS

Embodiments of the invention will now be described in conjunction with the accompanying drawings, wherein.

This invention will now be described in detail with respect to certain specific representative embodiments thereof, the materials, apparatus and process steps being understood as examples that are intended to be illustrative only. In particular, the invention is not intended to be limited to the methods, materials, conditions, process parameters, apparatus and the like specifically recited herein.

DETAILED DESCRIPTION OF THE PREFERRED EMBODIMENTS

An engine in accordance with embodiments of this invention is a two stroke crankcase compression engine with direct fuel injection. The described engine is similar in design to a conventional gasoline fuelled, air-cooled, two cycle, 1 to 3 kilowatt power, spark ignition engine, but with the cylinder modified in the manner described to employ direct fuel injection.

Figure 1:
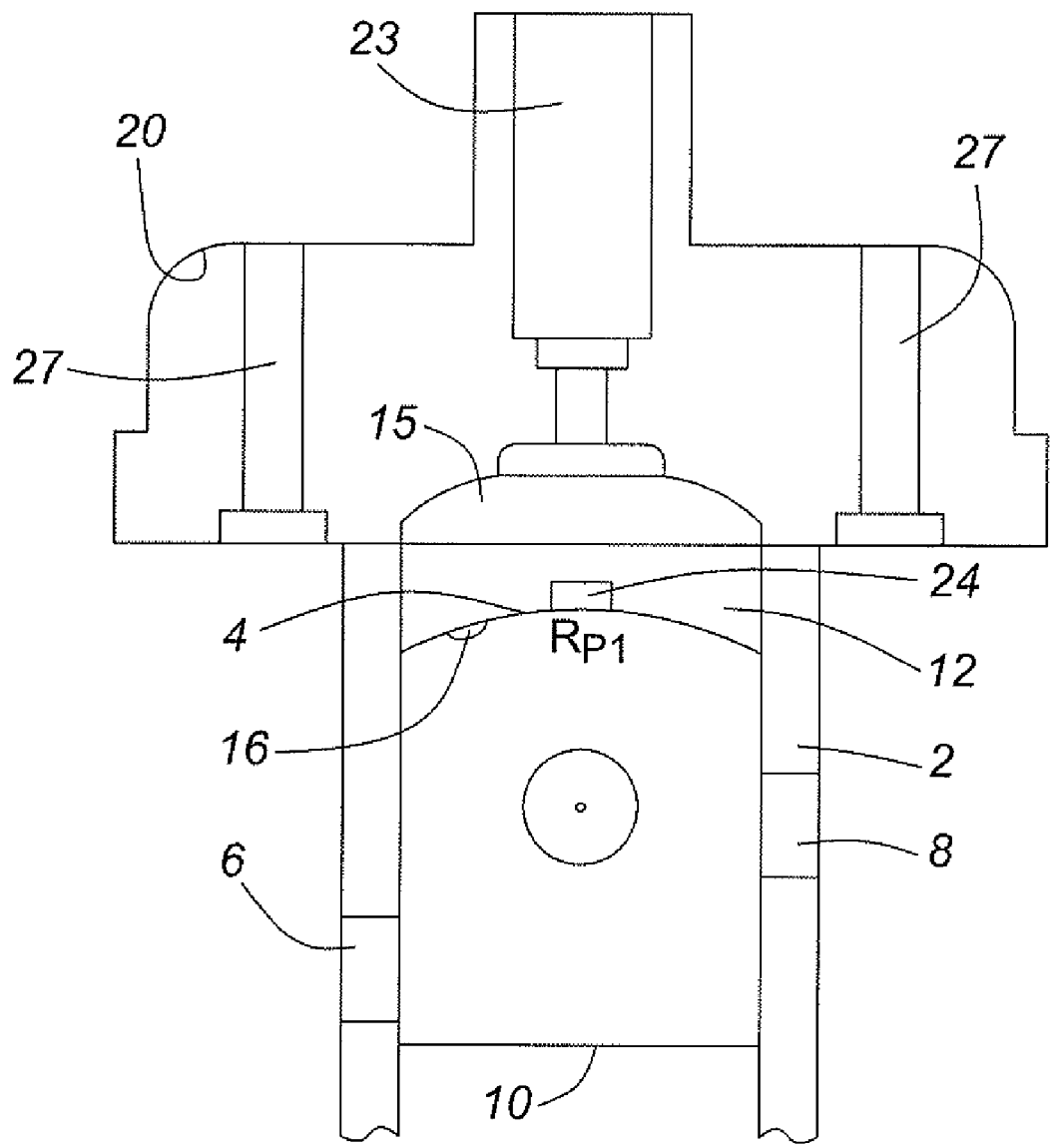
FIG. 1 illustrates a piston and cylinder arrangement of a diesel engine in accordance with teachings of this invention.

Referring to FIG. 1, the engine includes a cylinder 2 and a piston 10 mounted for reciprocating movement in the cylinder 2 on the end of a piston connecting rod (not shown). The cylinder preferably accommodates an approximate 80cc displacement of the piston. The piston 10 has a crown 4 that is in the shape of a dome with the middle of the piston protruding upwards into a correspondingly bowl shaped chamber 15 in the cylinder head 20.

The cylinder 2 has intake ports (or transfer ports), one port 6 being seen, more or less diametrically opposed to an exhaust port 8. Other functional two-stroke arrangements may be used. A crank case compression process moves air at high pressure into combustion chamber 12 through the intake ports. The combustion gases are exhausted through exhaust port 8 in a conventional manner during the downward stroke of piston 10.

The cylinder 2 is closed by cylinder head 20 firmly bolted in place by means of strong steel bolts 27.

Figure 2:
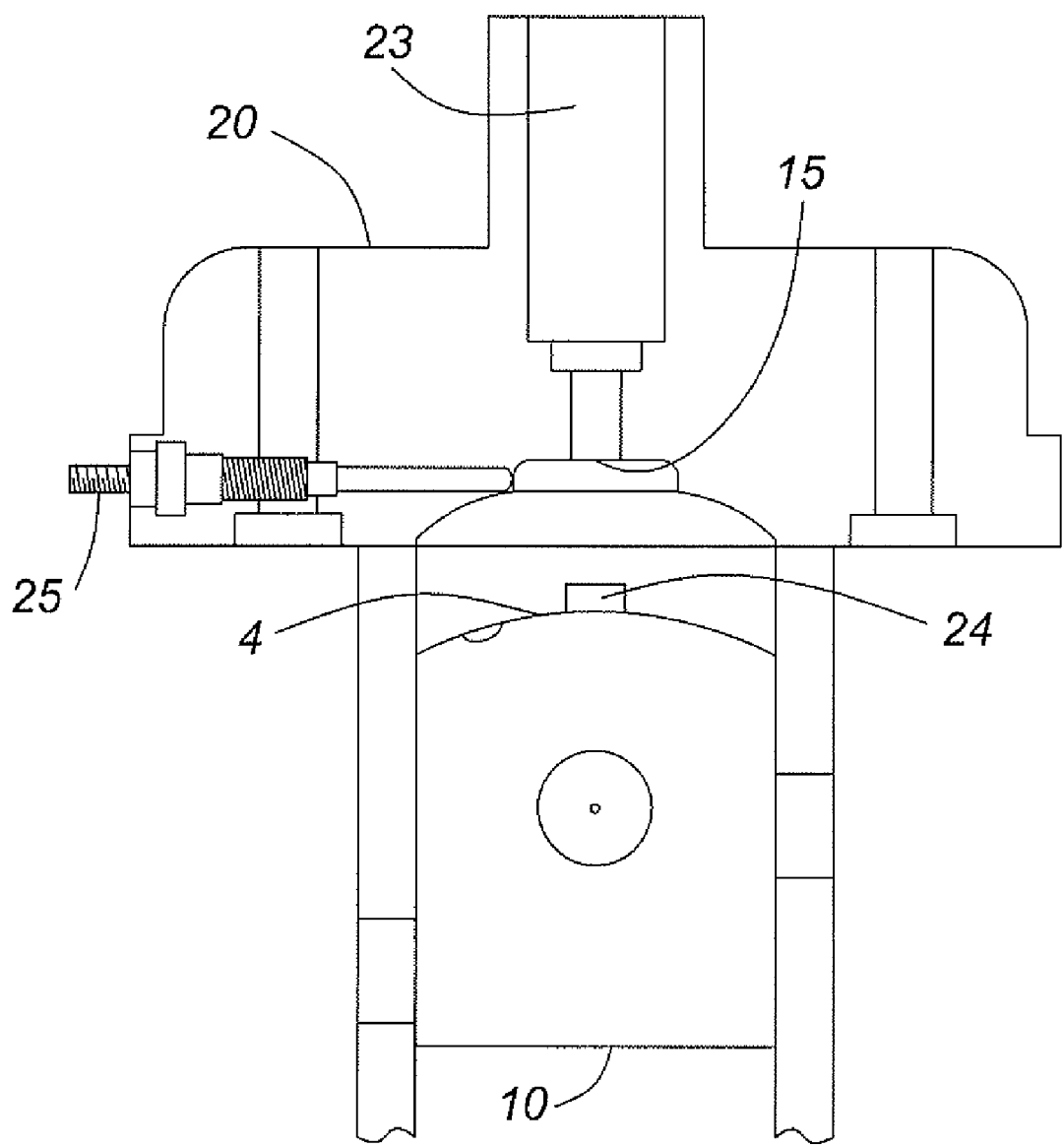
FIG. 2 illustrates the arrangement of FIG. 1, with a glow plug.

Referring to FIG. 2, a small 50 to 90 W (preferably 70 W) glow plug 25 protrudes into the bowl shaped chamber 15 in the cylinder head 20 such that it comes close to the periphery of a fuel injection spray plume (not shown). The piston crown 4 includes a recess 16 corresponding to the shape of the glow plug such that the piston 10 and glow plug 25 do not contact each other. The glow plug position is such that the plume does not impinge on the glow plug as described in more detail below. The glow plug 25 is shown in FIG. 2 to be oriented horizontally, however the glow plug can also be oriented vertically or at any suitable angle. The glow plug is preferably only used for starting the engine, and is shut off during operation of the engine.

Figure 3:
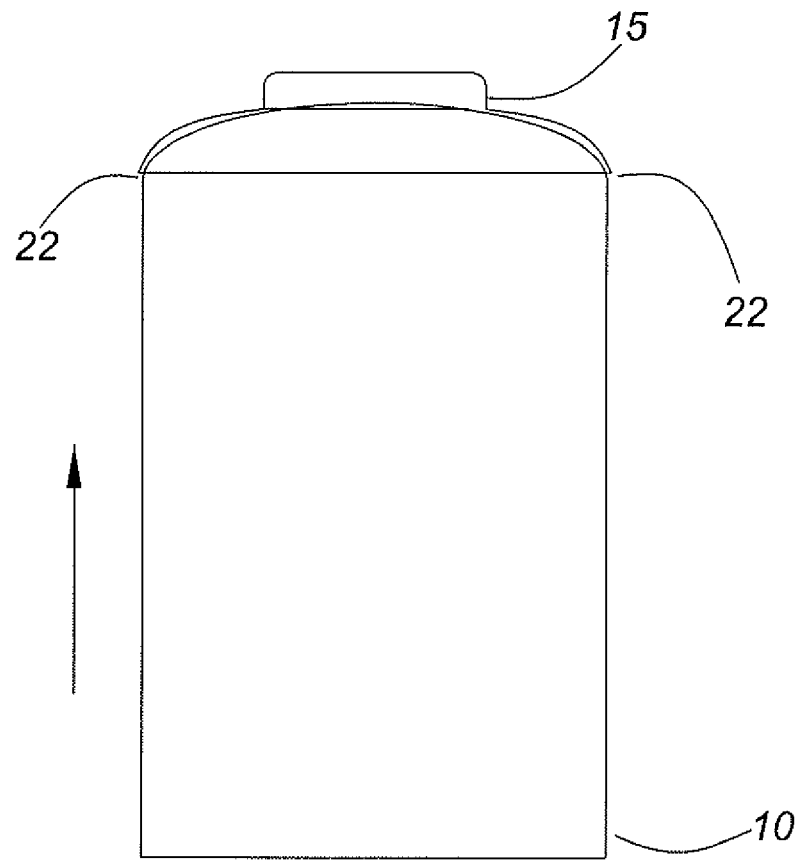
FIG. 3 illustrates the piston entering the combustion bowl and forming a squish area.

As mentioned above, the cylinder head 20 has a shallow bowl for the combustion chamber 15. The shape shown in the figures can vary and is merely illustrative of a typical shape. As seen in FIG. 3, the combustion chamber 15 has a minimal squish area 22 at the edges of the piston 10. This squish area 22 squishes the mixture of fuel, lubricating oil, air and residual products of combustion toward the centre of the combustion chamber as the piston approaches top dead centre (TDC) in the direction indicated by the arrow. The squish area 22 should be as small as possible but not so small that when deposits are formed within the squish area 22 the piston crown 4 contacts the cylinder head 20. Deposits formed on the piston crown and cylinder head are easy to clean on a periodic basis.

The use of a combustion chamber 15 in the shape of a shallow bowl with a piston crown 4 that reciprocates within the combustion chamber during the combustion process results in a variable geometry effect for the chamber. The variable geometry configuration has a number of advantages. In particular, the variable geometry has the effect of reducing the rates of combustion pressure rise, which permits moderately low compression ratios so that the maximum combustion pressure is less than 1,500 psi, whilst injecting fuel fairly early in the combustion cycle approximately 25 to 27 CA degrees before TDC. The variable geometry configuration also reduces aerodynamic losses on a relative basis as the combustion gases expand.

The piston 10 is shown to have a crown 4 comprised of one spherical convex surface. The convex surface has a radius $R_{p1}$ located on the centreline of the combustion chamber 15. The convex surface forms the outer edges of the piston 10 to form a minimal squish area, as discussed below. The radius of the surface is complementary to the shape of the combustion chamber, so that a minimal squish area near the cylinder wall is small, but not so small that the combustion chamber and piston crown do not contact one another. An exemplary dimension is 2.4 inches. The piston can also include a protrusion 24 extending upwards from the crown 4, which further maximizes protrusion of the piston into the chamber. The protrusion can be heat retaining or heat insulating as the application requires.

Figure 4:
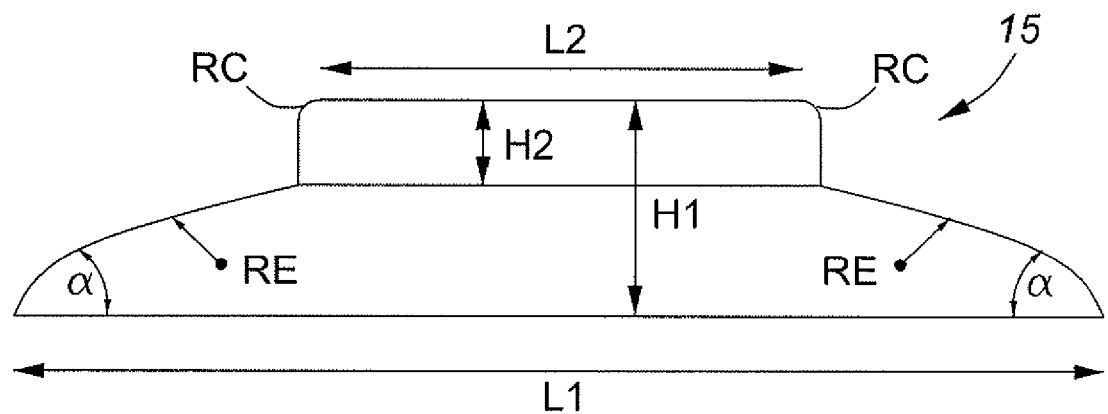
FIG. 4 illustrates details of a combustion bowl in accordance with the teachings of this invention.

Referring to FIG. 4, shallow bowl 15 should be sufficiently broad and shallow to provide a minimal squish area 22 at the outer edges of the bowl. The piston protrusion 4 should be in a corresponding shape to provide a variable geometry effect with the shallow bowl 15. Preferably the chamber comprises two separate sections, a first bottom section comprising a near trapezoidal shape with curved side edges and a second top section comprising a more rectangular section with chamfered corners. By definition, L1 is the length of the bottom edge of the chamber, H1 is the height of the chamber, H2 is the height of the second top section, L2 is the length of the top edge of the chamber, α is the approximate tangential angle between the bottom edge and the curved side walls extending from the bottom edge forming the first section, RE is the radius of the curved side walls of the first bottom section, and RC is the radius of the top corner of the chamber. Exemplary relative dimensions are (in inches):

| | |
|---|---|
| α | 23.6 |
| RE | 2.4 |
| RC | 0.06 |
| H1 | 0.3 |
| H2 | 0.2 |
| L1 | 1.9 |
| L2 | 0.95 |

In one embodiment, $R_{p1}$ equals RE. A person ordinarily skilled in the art will understand that these dimensions can vary within acceptable limits so long as a minimal squish area that extends the time that contact between the cylinder head and piston crown is avoided and a variable geometry effect are achieved.

The combustion bowl 15 in the cylinder head 20 also enables better dissipation of heat via cooling fins on the cylinder head assembly, or some other suitable means.

Bore 23 receives the fuel injection line (not shown) and accommodates the fuel injector nozzles (not shown). Additional improvements in the control of rate of combustion pressure rise (to less than 200 psi/CA degree) can also be achieved by optimized nozzle orifice geometry. An optimized selection of the diameter size of the high pressure fuel line between the fuel injector and the fuel pump has been shown to improve the control of rate of combustion pressure rise. In particular, use of 5 to 8 small (approximately 0.004 inches in diameter) orifices in the fuel injector nozzle can be used. The diameter of the line is optimized to provide an injection pressure to activate a small nozzle. The fuel injection line diameter is determined using iterations as known in the art.

Maintaining fairly low maximum fuel injection pressures (12,000 psi) to ensure that no injected fuel spray impingement occurs on the combustion chamber surfaces also improves the control of the rate of combustion pressure rise.

The use of a glow plug 25 directly in the combustion chamber 15 enables a lower compression ratio to be used and still have easy hand starting of the engine. The use of the recess 16 to prevent the surface of the glow plug 25 from contacting the piston surface 4 further improves performance. In addition, Applicants have found that use of the glow plug 25 in conjunction with a starting system (not shown) has enabled the engine to move from difficult hand starting at temperatures of 15 C to a cold starting capability of at least −11 C. In a preferred embodiment, the starting system is a manual recoil starter which uses a compact battery pack such as a Li-Ion battery pack for the glow plug.

In order to make an engine run satisfactorily and cleanly on diesel fuels, prior diesel engines have relied on a high combustion pressure rise to ensure ignition. However, an engine in accordance with the teachings of this invention enjoys a reduced combustion pressure rise and improved ignition/combustion. This leads to lower compression ratios. In particular, the present engine is designed to run at an approximate compression ratio of about 14 to 16:1, or lower. The result of a lower rate of combustion pressure rise and compression ratios permits the engine components to be lighter.

Minimal exhaust system emissions and combustion chamber deposits have been achieved by providing oxygen to the combustion process by ensuring reasonable air/fuel (A/F) mixing. Optimized transfer port shape, geometry and airflow orientation enhances combustion chamber air fuel mixing. The piston near bottom dead centre provides air intake. The air circulates as the piston rises. The A/F mixing is further enhanced by employing 5 to 8 optimally angled fuel spray plumes from the very tiny nozzle orifices. In addition, having the fuel spray penetrating the combustion chamber space right up to the cylinder walls without wetting any portion of the combustion chamber surfaces also improves the exhaust system emissions and combustion chamber deposits.

High output power (above 1.5 kW) has been achieved by use of larger air intake transfer ports. A higher level of fuel air mixing allows for the engine speed to climb up to approximately 5200 rpm since most of the fuel air mixture has been combusted.

During initial starting preferably fuel is injected a few degrees before TDC. The fuel ignites immediately due to the proximity of the glow plug to an injected spray plume. This means that high levels of turbulence are not as necessary to ensure good combustion, as is the case in other engine designs, and hence, aerodynamic and heat transfer losses can be further reduced. After a few moments of operation to warm the cylinder and combustion chamber the glow plug can be shut off. When the glow plug is shut off, the injected fuel is ignited by the auto-ignition (also referred to as compression ignition) process. The compression ignition process requires that certain temperatures and pressures be reached after the fuel is injected into the combustion chamber.

As in a conventional two-stroke engine, crank case compression can be used to provide the initial charge of compressed air to assist in pushing the exhaust gasses out of the exhaust port. Normally, the engine requires a forced air cooling system.

A small amount of lubricating oil is preferably pumped into the vicinity of intake port 6 on every other power stroke of the engine. The lubricating oil is dispensed by a metering pump (not shown) and injected into the air adjacent to the intake port 6. The lubricating oil is optimized with low viscosity ranges to provide improved atomizing. The lubricating oil is composed of a few optimized synthetic single molecule components that do not have a very high fire point and have a high bulk cetane number (above 50), and is injected into the intake airstream through a small orifice (approximately 0.030 inches in diameter). The high cetane number ensures that the lubricating oil will ignite early in the combustion chamber and the low fire point permits combustion of lubricating oil species when initiated that they can be completely consumed earlier in the combustion process. The low viscosity improves the lubricating oil to be better atomized. Smaller droplets of lubricating oil can be consumed by the combustion process more quickly than larger droplets. A high top ring location on the piston means that trapped fuel components, residual exhaust gas and lubricating oil in this crevice volume is minimized. This optimized lubricant further assists the process in reducing deposit formation.

The engine in accordance with the teachings of this invention weighs about 19 lbs or less and provides a power output of about 0.3 kW to 2 kW. Higher outputs are possible but engine durability could be compromised.

Current testing for 690 hours has shown the engine in accordance this teaching requires deposition removal in the combustion chamber, the piston crown and the glow plug after about 85 hours of operation. Tests were conducted at 350 W to 500 W at 3200 RPM. Using extrapolation, Applicant's believe that the engine can provide up to 125 hours of uninterrupted use before deposits have to be removed.

Testing on the piston indicates that the piston can operate for more than 500 hours. It is estimated that the piston can provide 1000 hours of durable use.

The described engine is similar in design to a conventional gasoline fueled, air cooled, two-cycle, 1 to 3 kilowatt power, spark ignition engine, but with the cylinder modified in the manner described to employ direct fuel injection.

While the engine has been described in conjunction with a two stroke crankcase compression engine, the engine can also be used in a four stroke compression ignition engine with intake and exhaust valves. The two stroke engine is preferred for its reduced weight and improved capability of reduced rates of combustion pressure rise.

The engine in accordance with this teaching can utilize any suitable diesel engine fuel or equivalent, such as Diesel Fuel ASTM #1 and #2D, JP8, NATO/F34 and NATO/F35 which Applicant's have found to be particularly appropriate.

An engine in accordance with the teachings of this invention is preferably used in a generator set. The generator set can be used in military applications such as battery charging for environmental protection suits or remotely piloted land/air vehicles. It has been found that a generator set using the disclosed engine can be airdropped and placed in and out of a rucksack in the dark. The generator set can also be used for civilian purposes such as firefighting, where gasoline-fuelled engines cannot be used for safety reasons. Because of the hazards associated with the high volatility of gasoline, gasoline-fueled engines cannot be employed in such environments, whereas the engine constructed in accordance with the present invention can.

In the case that the engine is used in a generator set, the bell housing is modified to accommodate the conversion of the gas engine to a diesel-fuelled compression ignition engine. The bell housing on the power take offend of the engine contains the camshaft for the high pressure fuel injection pump and a drive mechanism for the lubricating oil injection system. The rear of this bell housing has a third bearing (in addition to the two bearings in the crankcase) to support the increased length of the extended crankshaft. The bell housing provides a robust two stroke spark ignited (conversion) engine that would permit its crankcase assembly to be able to survive the approximately two times higher rates of combustion pressure rise.

Figure 5:
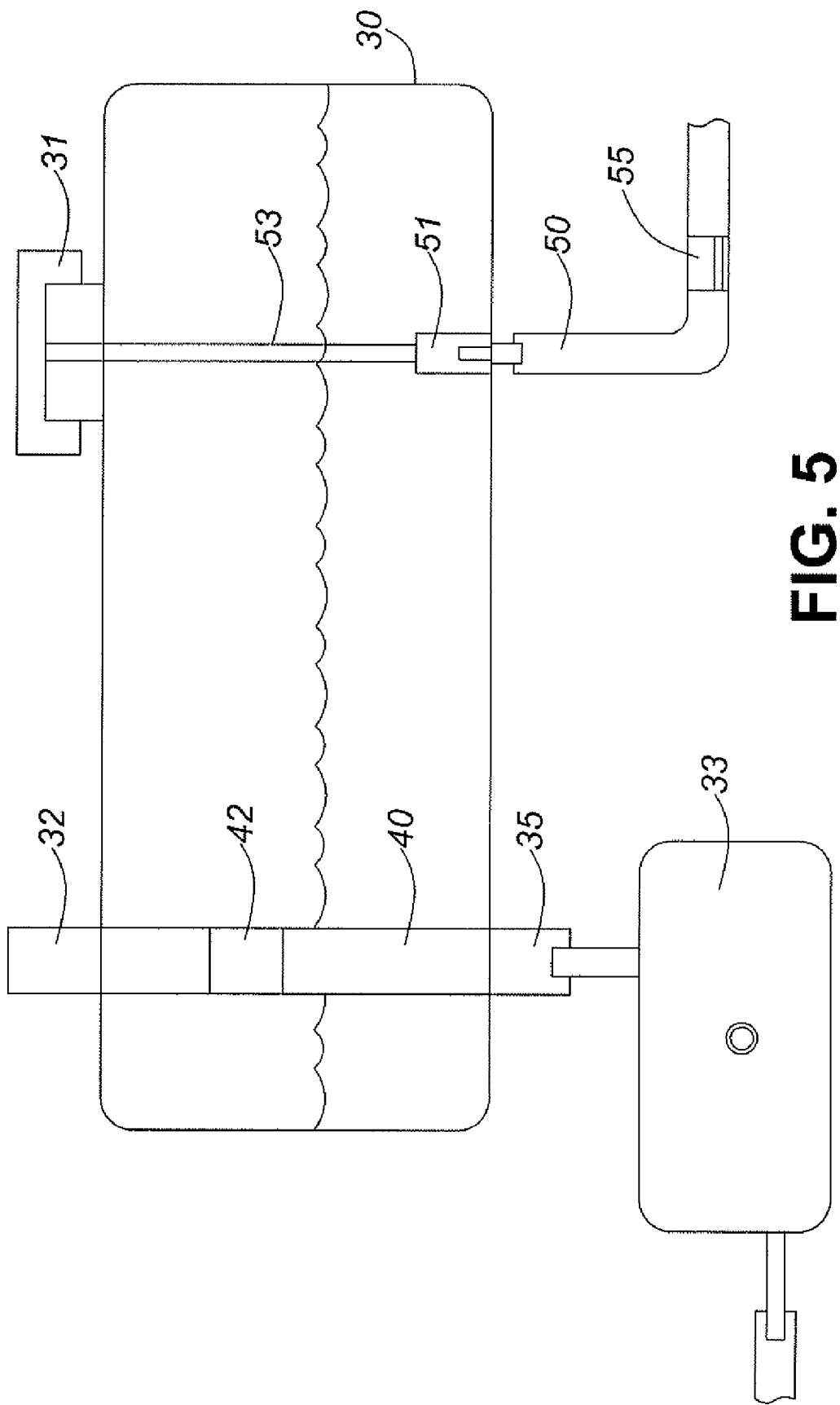
FIG. 5 illustrates one example of a fuel reservoir system that can be used in conjunction with a diesel engine in accordance with teachings of this invention.

A preferred embodiment of the fuel reservoir system is now described in conjunction with FIG. 5. The fuel reservoir 30 is sealed with a cap 31. A bleed valve 32 may be used to keep air within the fuel reservoir pressurized and to relieve pressure as the need arises. A pulse pump 33 pumps fuel from a fuel source (not shown) into the fuel reservoir 30. A tube 40 leading from the line 35 and extending above the fuel reservoir 30 receives the pumped fuel from the fuel source. The tube 40 includes an opening 42 therein. The fuel comes up through the tube 40 and falls into the fuel reservoir 30 via the opening 42. The opening 42 serves to keep a minimum level in the fuel reservoir 30. The fuel in the fuel reservoir 30 then flows through a filter 51. The filter 51 is kept in place with use of a rod 53 positioned between the filter 51 and the cap 31. The fuel line 50 fed under low pressure from the engine fuel reservoir may include a fuel flow restriction 55 before feeding the high pressure injection pump which provides fuel to the engine via the fuel injection line in bore 23 during use.

In another example (not shown), a fixed fuel system can be used, where a reservoir provides a gravity-feed to a high pressure fuel injection pump.

In yet another example (not shown), float chamber could be used.

As mentioned above, the geometry of the chamber 15 and use of a glow plug 25 leads to operation with a lower compression ratio. Lower compression ratios enable fuel to be combusted in a manner that is less stressful on the crankcase rotating components and make it easier to start by hand. As further improvement, the generator utilizing an engine in accordance with the teachings of this invention can also include a foot hold in the frame, which the user can use to provide improved leverage during hand starting.

A generator set using an engine in accordance with the teachings of this invention weighs about 35 lbs. The noise output from the generator is 47 dB at 100 meters. It is estimated that if the generator is surrounded with dirt or fuel containers, the noise level drops to about 40 dB. Further noise reductions are possible with little or no increase in weight or size.

Numerous modifications may be made without departing from the spirit and scope of the invention as defined in the appended claims.

What is claimed is:

1. A small diesel engine comprising:
    a small cylinder having a cylinder head defining a pre-combustion chamber therein, the pre-combustion chamber being in the shape of a broadened shallow bowl;
    a piston reciprocally mounted within said cylinder, the piston having a piston crown in the shape of a dome for protruding within the bowl-shaped pre-combustion chamber during a combustion event before and after top dead center, the piston protruding so as to enter the pre-combustion chamber; wherein the piston is further shaped such that the opening between the pre-combustion chamber and the cylinder head progressively enlarges when the piston is moving down after the top of its stroke so as to provide a variable geometry combustion chamber;
    a fuel injector for injecting fuel spray plumes into said pre-combustion chamber to facilitate the combustion process during the downward stroke of the piston; and
    a glow plug in the cylinder head and protruding into the bowl-shaped pre-combustion chamber in close proximity to an injected fuel spray plume but not in direct contact with the injected fuel to thereby facilitate fuel ignition at moderate compression ratios during engine starting, thereby facilitating use of a small cylinder displacement;
    wherein a minimal squish area is defined between the bowl-shaped chamber and edges of the piston as the piston approaches top dead center.

2. The diesel engine of claim 1 wherein the piston crown defines a recess to receive the glow plug such that the glow plug does not contact the piston.

3. The diesel engine of claim 2 wherein the glow plug is oriented horizontally within the cylinder head.

4. The diesel engine of claim 1 wherein the bowl-shaped chamber has a height H1 and comprises:
    a first bottom section comprising a trapezoidal shape with curved side walls, the first bottom section defining a bottom edge of the chamber of length L1 and having an angle $\alpha$ is the angle between the bottom edge and the curved side walls extending from the bottom edge, the side walls having a radius RE; and
    a second top section comprising a rectangular section with chamfered corners having a height H2 and defining a top edge of the chamber of length L2, the chamfered corners having a radius RC.

5. The diesel engine of claim 4 wherein L1 is 1.9, L2 is 0.95, $\alpha$ is 23.6 degrees, H1 is 0.3, H2 is 0.2, RC is 0.06 and RE is 2.4, all in inches.

6. The diesel engine of claim 4 wherein the piston crown is a smooth surface defined by a convex spherical surface with its radius taken along the centre line of the cylinder.

7. The diesel engine of claim 6 wherein the radius of the convex spherical surface is equal to RE.

8. The diesel engine of claim 6 wherein the piston has a protrusion extending upwards from the crown to maximize penetration of the piston into the chamber.

9. The diesel engine of claim 8 wherein the protrusion is either heat insulating or heat retaining.

10. The diesel engine of claim 1 which weighs about 18 lbs or less.

11. The diesel engine of claim 1, wherein the engine is as part of a generator set to provide a lightweight generator.

12. The diesel engine of claim 1 wherein an optimized lubricant is injected into the cylinder that can be made synthetically, which minimizes rate of deposit accumulation in the pre-combustion chamber.

13. The diesel engine of claim 1 comprising opposed inlet and exhaust ports in a wall of said cylinder to provide a two-stroke configuration for said engine.

14. A generator set, comprising:
    a diesel engine comprising:
        a cylinder having a cylinder head defining a pre-combustion chamber therein, the pre-combustion chamber being in the shape of a broadened shallow bowl;
        a piston reciprocally mounted within said cylinder, the piston having a piston crown in the shape of a dome for protruding within the bowl-shaped pre-combustion chamber during a combustion event before and after top dead center, the piston protruding so as to enter the pre-combustion chamber; wherein the piston is further shaped such that the opening between the pre-combustion chamber and the cylinder head progressively enlarges when the piston is moving down after the top of its stroke so as to provide a variable geometry combustion chamber;

a fuel injector for injecting fuel spray plumes into said pre-combustion chamber to facilitate the combustion process during the downward stroke of the piston; and a glow plug in the cylinder head and protruding into the bowl-shaped chamber in close proximity to the injected fuel spray plume but not in direct contact with the injected fuel to thereby facilitate fuel ignition at moderate compression ratios during engine starting, thereby facilitating use of a small cylinder;

wherein a minimal squish area is defined between the bowl-shaped chamber and edges of the piston as the piston approaches top dead center; and a fuel reservoir system comprising:

a fuel reservoir for containing fuel;

a pulse type fuel pump for pumping fuel from a fuel source to a second engine mounted fuel reservoir for use by the generator; and a fuel line under low pressure from the engine mounted fuel reservoir flowing through a fuel flow restrictor before feeding the high pressure injection pump located a few inches further downstream.

\* \* \* \* \*